United States Patent [19]
Sanders et al.

[11] Patent Number: 5,513,681
[45] Date of Patent: * May 7, 1996

[54] FUEL DISPENSING SYSTEM, HOSE ASSEMBLY THEREFOR AND METHODS OF MAKING THE SAME

[75] Inventors: John D. Sanders, Springfield; Randy C. Foster, Strafford, both of Mo.

[73] Assignee: Dayco Products, Inc., Dayton, Ohio

[*] Notice: The portion of the term of this patent subsequent to Oct. 4, 2011, has been disclaimed.

[21] Appl. No.: 263,966

[22] Filed: Jun. 22, 1994

Related U.S. Application Data

[62] Division of Ser. No. 182,924, Jan. 18, 1994, Pat. No. 5,351,727.

[51] Int. Cl.⁶ .............................. B65B 3/18; F16L 47/00; F16L 9/18
[52] U.S. Cl. ................. 141/59; 141/44; 141/302; 285/133.1; 138/109; 138/115
[58] Field of Search .................... 141/44–46, 59, 141/302; 138/109, 113, 115; 285/133.1

[56] References Cited

U.S. PATENT DOCUMENTS

| | | | |
|---|---|---|---|
| 4,687,033 | 8/1987 | Furrow et al. | 141/59 |
| 4,754,782 | 7/1988 | Grantham | 138/109 |
| 4,886,305 | 12/1989 | Martin | 285/133.1 |
| 4,922,971 | 5/1990 | Grantham | 141/1 |
| 5,005,613 | 4/1991 | Stanley | 141/45 |
| 5,056,569 | 10/1991 | Walker et al. | 141/44 |
| 5,141,037 | 8/1992 | Carmack et al. | 141/206 |
| 5,156,191 | 10/1992 | Walker et al. | 138/113 |
| 5,285,744 | 2/1994 | Grantham et al. | 141/59 |
| 5,285,826 | 2/1994 | Sanders et al. | 141/59 |
| 5,351,727 | 10/1994 | Sanders et al. | 141/59 |

*Primary Examiner*—Henry J. Recla
*Assistant Examiner*—Steven O. Douglas
*Attorney, Agent, or Firm*—Joseph V. Tassone

[57] ABSTRACT

A system for dispensing fuel, a hose assembly therefor and methods of making the same are provided, the hose assembly having a spider to maintain the inner hose thereof concentric within the outer hose thereof, the spider being secured to the inner hose and to the dispensing nozzle so that the nozzle, the spider and the inner hose are adapted to rotate in unison relative to the liquid fuel source unit of the system whereby a tubular unit interconnected to a venturi unit in the nozzle and leading to a drape area within the hose assembly for evacuating any liquid collecting in the vapor recovery passage thereof will also rotate in unison with the nozzle, the spider and the inner hose.

9 Claims, 6 Drawing Sheets

FIG. 14

FUEL DISPENSING SYSTEM, HOSE ASSEMBLY THEREFOR AND METHODS OF MAKING THE SAME

CROSS REFERENCE TO RELATED APPLICATIONS

This application is a divisional patent application of its parent patent application, Ser. No. 182,924, filed Jan. 18, 1994, now U.S. Pat. No. 5,351,727.

BACKGROUND OF THE INVENTION

1. Field of the Invention

This invention relates to a new fuel dispensing system and to a new hose assembly for such a system as well as to new methods of making such a system and such a hose assembly.

2. Prior Art Statement

It is known to provide a system comprising a liquid fuel source unit, a dispensing nozzle, and a hose assembly having a first fluid passage therein for conveying the liquid fuel in one direction from the liquid fuel source unit to the nozzle that is adapted to dispense the liquid fuel into a container and a second fluid passage therein for returning the vapors of the liquid fuel from the container to the liquid fuel source unit, the hose assembly comprising a flexible inner hose having an outer peripheral surface and defining the first fluid passage therein, and a flexible outer hose having an inner peripheral surface and being disposed around the inner hose, the inner peripheral surface of the outer hose and the outer peripheral surface of the inner hose defining the second fluid passage therebetween, the nozzle having a venturi section therein that tends to remove liquid from a drape area of the hose assembly when the nozzle is being utilized to dispense the liquid fuel into the container, the hose assembly having opposite ends one of which is connected to the nozzle and the other of which is interconnected to the liquid fuel source unit, the one end of the hose assembly having a spider therein that tends to maintain the inner hose concentric within the outer hose. For example, see the U.S. Pat. No. to Carmack et al, 5,141,037.

It is also known to make the spider of two parts that rotate relative to each other and to interconnect one of the spider parts with a first tube section that interconnects a passage means through the spider to the venturi section of the nozzle and to interconnect a second tube section to the second part of the spider with that second tube section having an inlet located in the drape area, the other part of the spider being integral and one-piece with the insert of a coupling at the one end of the hose assembly that is interconnected to the nozzle whereby the nozzle and the one spider part can rotate relative to the other spider part and the inner hose.

For other arrangements for removing liquid from the drape area of a hose assembly being utilized in a fuel dispensing system see the U.S. Pat. No. to Furrow et al, 4,687,033; the U.S. Pat. No. to Grantham, 4,754,782 and the U.S. Pat. No. to Walker et al, 5,056,569.

SUMMARY OF THE INVENTION

It is one of the features of this invention to provide a new hose assembly for a fuel dispensing system wherein the pickup tube means for evacuating the liquid in the vapor recovery passage at the drape area of the vapor recovery hose assembly will not be disconnected from the dispensing nozzle should that dispensing nozzle be rotated relative to the liquid fuel source unit.

In particular, it was found according to the teachings of this invention that the spider means that tends to hold the inner hose of the hose assembly concentric within the outer hose of the hose assembly at the end of the hose assembly that is interconnected to the dispensing nozzle can be secured not only to the inner hose but also to the nozzle so that the inner hose, the spider means and the nozzle will rotate in unison relative to the liquid fuel source unit whereby the pickup tube means can be connected to a passage means of the spider means and also rotate in unison therewith so as not to be disconnected from the dispensing nozzle.

For example, one embodiment of this invention comprises a system comprising a liquid fuel source unit, a dispensing nozzle and a hose assembly having a first fluid passage therein for conveying the liquid fuel in one direction from the liquid fuel source unit to the nozzle that is adapted to dispense the liquid fuel into a container and a second fluid passage therein for returning the vapors of the liquid fuel from the container to the liquid fuel source unit, the hose assembly comprising a flexible inner hose having an outer peripheral surface and defining the first fluid passage therein, and a flexible outer hose having an inner peripheral surface and being disposed around the inner hose, the inner peripheral surface of the outer hose and the outer peripheral surface of the inner hose defining the second fluid passage therebetween, the nozzle having a venturi section therein that tends to remove liquid from a drape area of the hose assembly when the nozzle is being utilized to dispense the liquid fuel into the container, the hose assembly having opposite ends one of which is interconnected to the nozzle and the other of which is interconnected to the liquid fuel source unit, the one end of the hose assembly having a spider means therein that tends to maintain the inner hose concentric within the outer hose, the spider means having a passage means therethrough, the system comprising a first tube section connecting the passage means to the venturi section and a second tube section connected to the passage means and having inlet means located in the drape area, the spider means being secured to the inner hose and to the nozzle so that the nozzle, the spider means and the inner hose are adapted to rotate in unison relative to the liquid fuel source unit.

Accordingly, it is an object of this invention to provide a new system for dispensing fuel from a liquid fuel source unit into a container or the like, the system of this invention having one or more of the novel features of this invention as set forth above or hereinafter shown or described.

Another object of this invention is to provide a new method of making such a system, the method of this invention having one or more of the novel features of this invention as set forth above or hereinafter shown or described.

Another object of this invention is to provide a new hose assembly for such a system, the hose assembly of this invention having one or more of the novel features of this invention as set forth above or hereinafter shown or described.

Another object of this invention is to provide a new method of making such a hose assembly, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

While the various features of this invention are hereinafter illustrated and described as being particularly adapted to provide a hose assembly of a particular configuration, it is to be understood that the various features of this invention can be utilized singly or in various combinations thereof to provide hose assemblies having other configurations as desired.

Therefore, this invention is not to be limited to only the embodiments illustrated in the drawings, because the drawings are merely utilized to illustrate one of the wide variety of uses of this invention.

Figure 1:
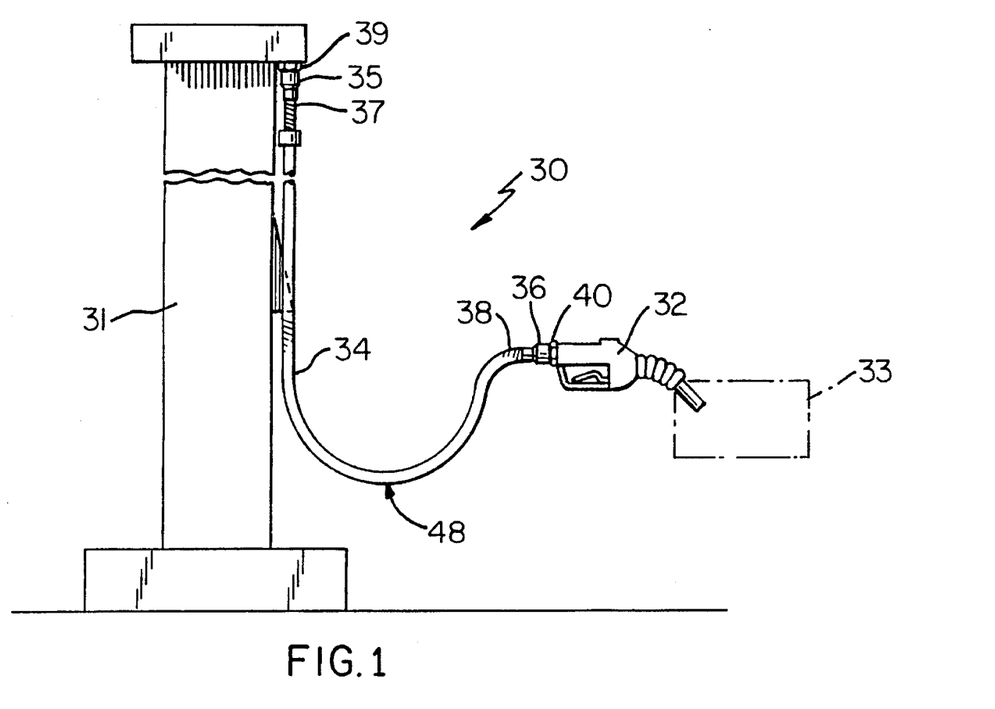
FIG. 1 is a schematic view illustrating the new fuel dispensing system of this invention.

Referring now to FIG. 1, the new liquid fuel dispensing system of this invention is generally indicated by the reference numeral 30 and comprises a liquid fuel source unit 31, such as a curb side fuel pump of a gasoline station or the like, a dispensing nozzle 32 for dispensing fuel from the source unit 31 into a container 33, such as the fuel tank of a transportation vehicle or the like, and a hose assembly 34 interconnecting the fuel source 31 to the dispensing nozzle 32.

The hose assembly 34 has suitable coupling means 35 and 36 at the opposite ends 37 and 38 thereof respectively coupling to coupling means 39 and 40 of the liquid fuel source unit 31 and the nozzle 32 all in a manner well known in the art. For example, see the aforementioned U.S. Pat. No. to Furrow et al, 4,687,033 and the U.S. Pat. No. to Walker et al, 5,056,569 whereby these two U.S. patents are being incorporated into this disclosure by this reference thereto.

Figures 7, 8, 9:
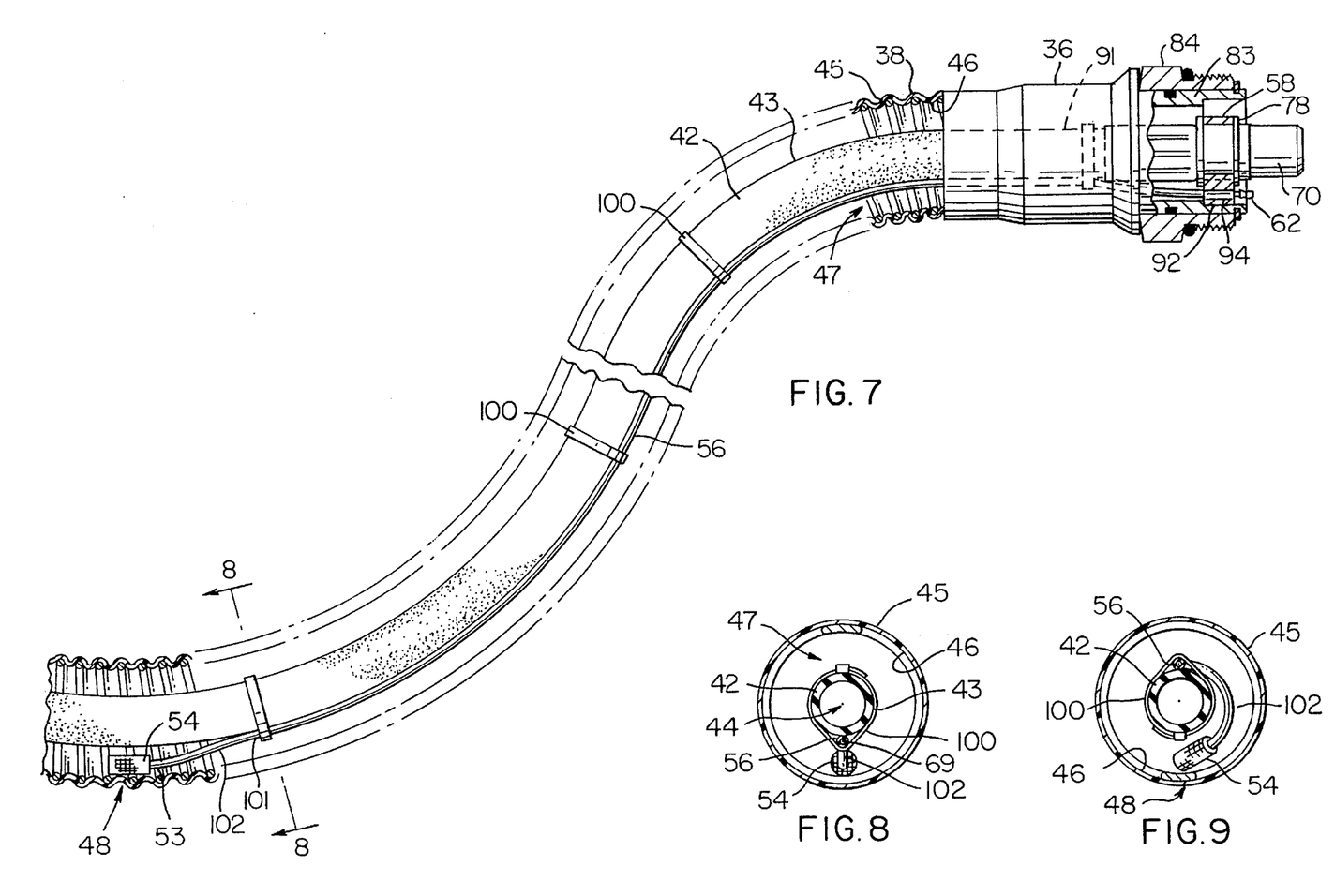
FIG. 7 is an enlarged fragmentary cross-sectional view of part of the hose assembly of FIG. 1.
FIG. 8 is a cross-sectional view taken on line 8—8 of FIG. 7.
FIG. 9 is a view similar to FIG. 8 and illustrates the position of the parts of the hose assembly when the inner hose thereof has been rotated 180° from the position illustrated in FIG. 8.

The hose assembly 34 is best illustrated in FIG. 7 and comprises a flexible inner hose 42 having an outer peripheral surface means 43 and defines a fluid passage 44, FIG. 8, therein that conveys the liquid fuel in one direction from the fuel source unit 31 to the dispensing nozzle 32. The hose assembly 34 also comprises a flexible outer hose 45 having an inner peripheral surface means 46 and being disposed around the inner hose 42, the inner peripheral surface means 46 of the outer hose 45 and the outer peripheral surface means 43 of the inner hose 42 defining a second fluid passage 47 therebetween for returning vapors of the liquid fuel from the container 33 into which the liquid fuel is being dispensed by the dispensing nozzle 32. The returning vapors are directed to a vapor recovery system (not shown) that is located at the liquid fuel source unit 31 all in a manner well known in the art as fully disclosed in the aforementioned two U.S. patents.

As illustrated in FIGS. 1 and 7, the system 30 has the hose assembly 34 disposed in a fuel dispensing condition thereof wherein the nozzle 32 is being held in a normal position for dispensing fuel into a fuel tank of a vehicle that is pulled alongside the fuel source unit or pump means 31 whereby the hose assembly 34 has a low drape area that is indicated by the reference arrow 48 in FIGS. 1 and 7.

It is well known in the art that liquid fuel tends to collect in the vapor recovery passage 47 at the low drape area 48 of the hose assembly 34 and thereby tends to prevent vapors from being returned from the fuel receiving container 33 back to the recovery means of the liquid fuel source unit or pump means 31 whereby venturi means have been utilized to evacuate any liquid that tends to collect in the low drape area 48.

For example, the aforementioned U.S. Pat. No. to Walker et al, 5,056,569 provides a venturi means in the inner hose of the hose assembly thereof that will be located at the drape area of the hose assembly whereas the aforementioned U.S. Pat. No. to Farrow et al 4,687,033 provides a venturi means at the base of the dispensing nozzle so that such venturi means will be in alignment with the passage through the inner hose of the hose assembly thereof and has a flexible pickup tube leading to the drape area of the vapor recovery passage of the hose assembly. In contrast, certain dispensing nozzles have a venturi means therein which is utilized for dual functions one of which is to close the fuel control valve in the nozzle when the venturi port senses fuel from the filling of the container receiving the same and the other of which is designed to remove fuel from the vapor recovery passage by means of a flexible tubular length leading from the dispensing nozzle and in the vapor recovery passage of the hose assembly so that an inlet end of the flexible tube will be located at the drape area of the hose assembly. Such venturi means in the dispensing nozzle is normally called a "pop-off venturi" and is fully disclosed in the aforementioned patent to Carmack et al, U.S. Pat. No. 5,141,037 as well as the U.S. Pat. No. to Butkovich et al, 5,234,036 whereby these two U.S. patents are also being incorporated into this disclosure by this reference thereto.

Figure 14:
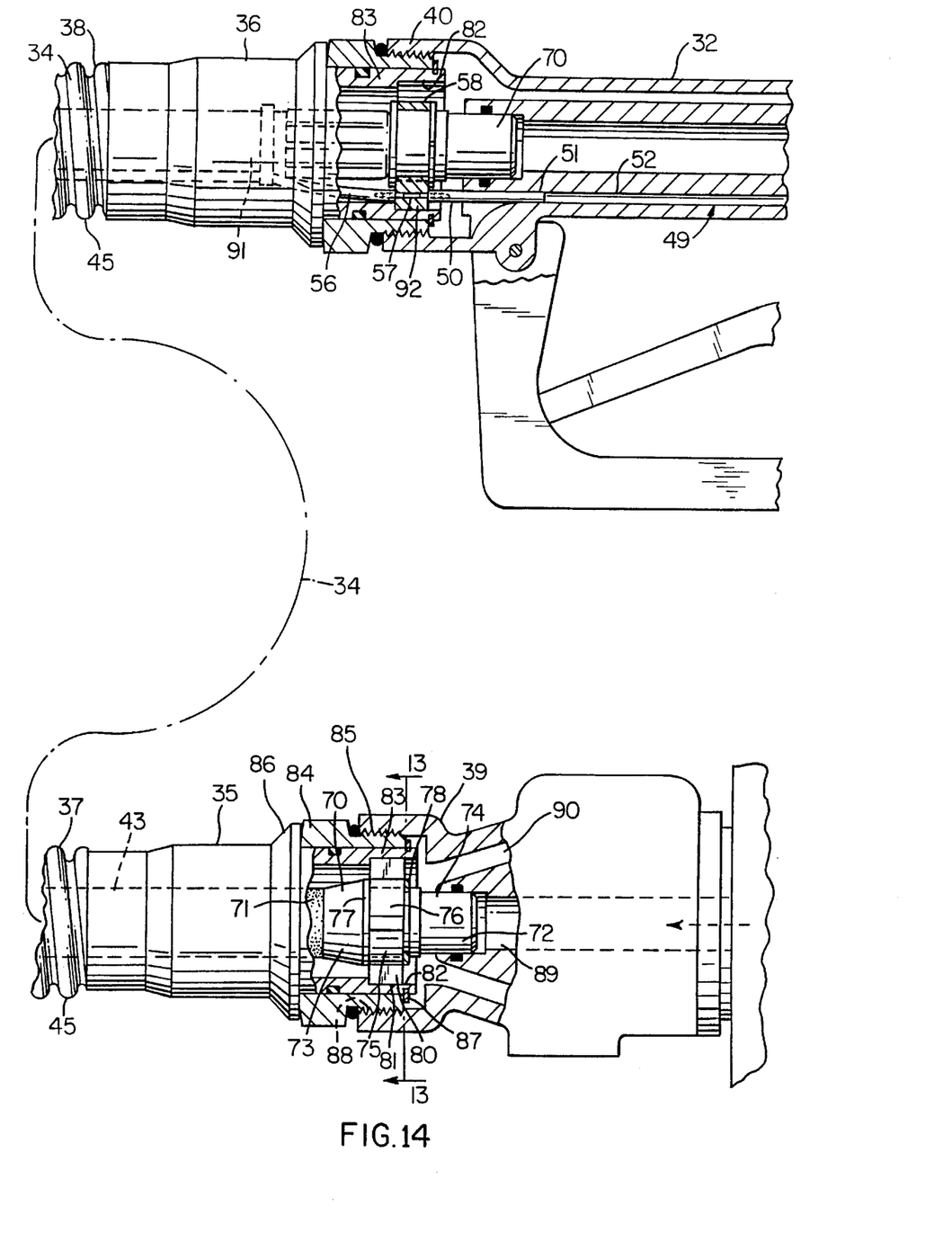
FIG. 14 is a fragmentary cross-sectional view of the hose assembly of this invention interconnected to the dispensing nozzle and to the liquid fuel source unit.

Therefore, while the nozzle 32 of the system 30 of this invention has such a pop-off venturi means therein, the details thereof are not set forth in the drawings and such pop-off venturi means is generally given the reference numeral 49 in FIG. 14 and will create a vacuum in a tube means 50 of the system 30 of this invention which has one end 51 thereof disposed in a passage means 52 of the dispensing nozzle 32 that leads to the venturi means 49 and another end 53 that is located in the vapor recovery passage 47 adjacent the drape area 48 of the hose assembly 34 and comprises an inlet means 54 that is a filter means through which the liquid must pass from the drape area 48 into the tubular means 50 in a manner that is generally well known in the art.

Figures 15, 17, 18:
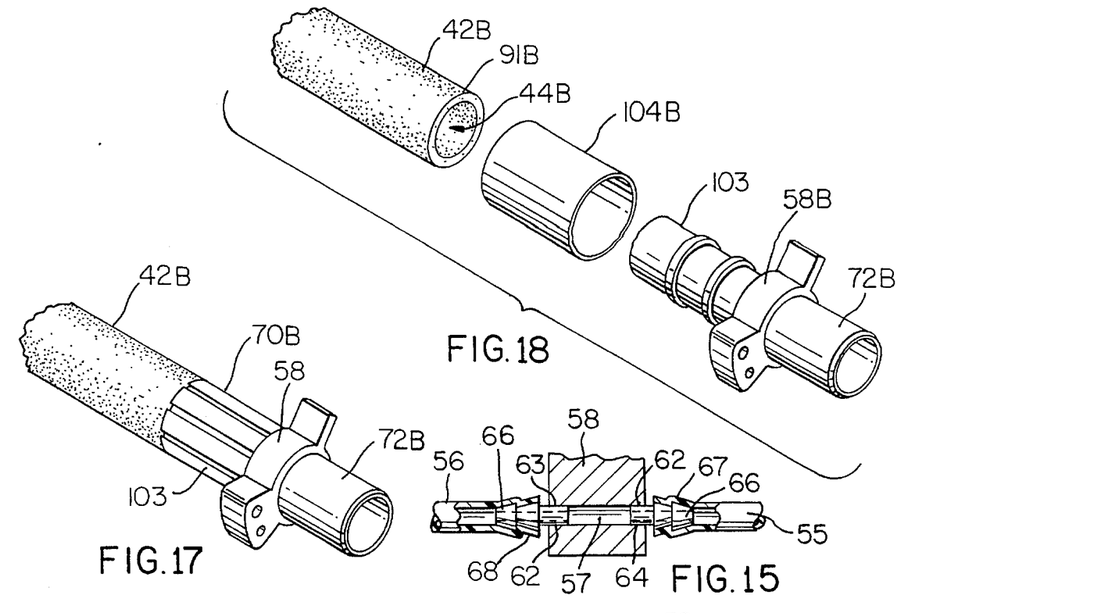
FIG. 15 is a enlarged fragmentary cross-sectional view of a part of one of the spider means of the hose assembly of FIG. 14.
FIG. 17 is a fragmentary perspective view of another embodiment of one end of the inner hose of the hose assembly of this invention.
FIG. 18 is a fragmentary exploded perspective view of the various parts that form the inner hose of FIG. 17.
Figures 16, 19, 20:
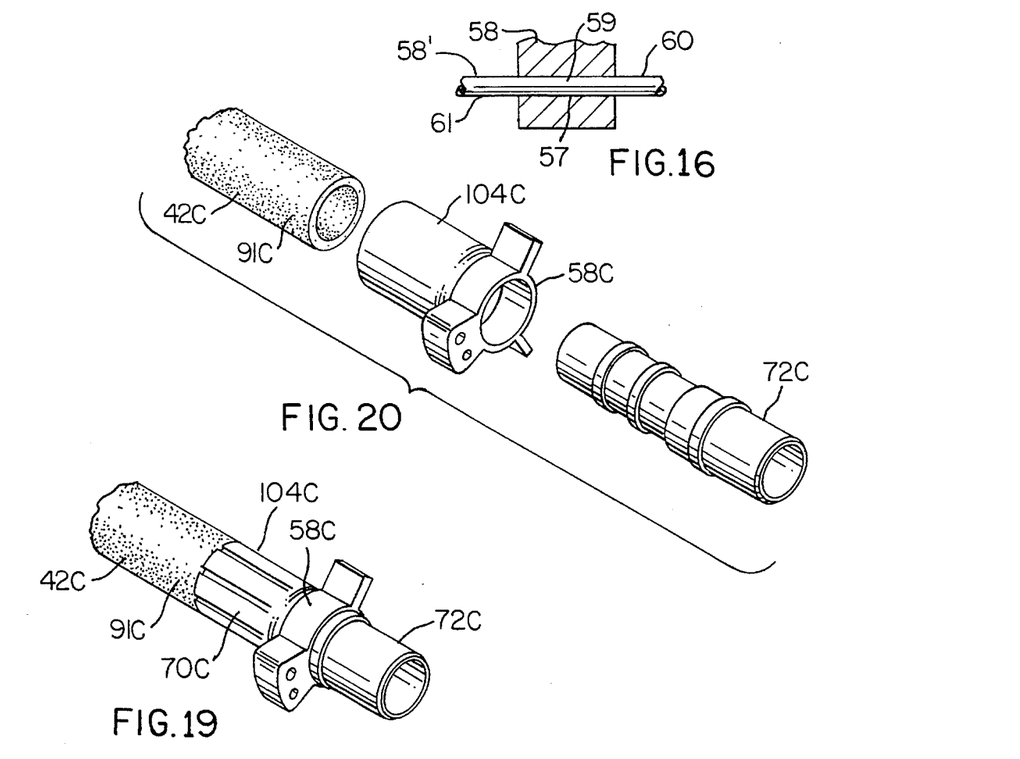
FIG. 16 is a view similar to FIG. 15 and illustrates another embodiment of this invention.
FIG. 19 is a view similar to FIG. 17 and illustrates another inner hose of this invention that can form the hose assembly of this invention.
FIG. 20 is an exploded perspective view of various parts of the inner hose of FIG. 19.

While the embodiment of the system 30 of this invention illustrated in FIGS. 1–15 has the tubular means 50 formed from a first tube section 55, FIG. 14, and a second tube section 56, FIGS. 7 and 14, that is separate from the first tube section 55 and is fluidly interconnected thereto by a passage means 57, FIGS. 14 and 15, that is formed through a spider means 58 of the hose assembly 34 in a manner hereinafter set forth, the tube means 50 can comprise a single tube 58' as illustrated in FIG. 16 that merely has a portion 59 thereof that is disposed in the passage means 57 of the spider means 58 if desired so that a first tube section 60 of the single tube 58' extends in one direction from the spider means 58 of FIG. 16 and a second tube section 61 extends from the other side of the spider means 58 in the same manner and for the same purpose that the first tube section 55 extends from one side of the spider means 58 in FIG. 15 and the second tube section 56 extends from the other side of the spider means 58 as illustrated in FIG. 15.

However, when the tubular means 50 is formed of the two separate sections 55 and 56, a pair of nipple-like inserts 62 are respectively inserted in opposite ends 63 and 64 of the passage means 57 of the spider means 58 in the manner illustrated in FIG. 15 and secured thereto in any suitable manner, such as by being press-fit into the passage means 57, so that nipple ends 66 of the inserts 62 can respectively have the ends 67 and 68 of the tube sections 55 and 56 respectively pushed onto the same to not only hold the ends 67 and 68 thereon but also to fluidly interconnect the tube sections 55 and 56 together by means of the passage means 57 of the spider 58. In this manner the inlet means 54 of the tubular means 50 is fluidly interconnected to the end 51 thereof so that the venturi means 49 can provide a vacuum in the internal passage means 69, FIG. 8, of the tubular means 50 whether the tubular means 50 is formed of the two separate tube sections 55 and 56 or from the single tube 58' so as to remove liquid from the drape area 48 of the vapor recovery passage 47 of the hose assembly 34 in a manner well known in the art whereby such further description of the liquid removal and how it is accomplished by the venturi means 49 need not be further set forth.

However, as previously stated, it is one of the features of this invention to prevent the tubular means 50 of the system 30 from being inadvertently disconnected from the nozzle 32 during the use of the nozzle 32 in the system 30 of this invention and this feature is uniquely provided by the spider means 58 of the hose assembly 34 in a manner now to be described.

The use of a spider means or clip means to hold an inner hose substantially concentrically within an outer hose at one end of a hose assembly is well known in the art. For example, see the aforementioned U.S. Pat. No. to Walker et al, 5,056,569 as well as the aforementioned U.S. Pat. No. to Grantham, 4,754,782 and the U.S. Pat. No. to Basham, 3,980,112 whereby these last two U.S. patents are also being incorporated into this disclosure by this reference thereto.

As illustrated in FIG. 14, the inner hose 42 has a coupling 70 attached to an end 71 thereof in a conventional manner and comprising an insert portion 72 and a ferrule portion 73 with the insert portion 72 having a tubular section 74 that telescopically receives an annular portion 75 of a spider means 76 thereon between an annular flange 77 of the insert portion 72 and a split ring 78 subsequently disposed in an annular groove 79 of the insert 72 so that the spider means 76 can rotate on the insert portion 72 between the annular flange 77 and split ring 78 as fully disclosed in the aforementioned U.S. Pat. No. to Walker et al, 5,056,569.

The spider means 76 has a plurality of radially outwardly directed and spaced apart substantially straight legs 80 that have free ends 81 that engage against an internal peripheral surface means 82 of a tubular part 83 of the coupling means 35 of the hose assembly 34 that couples to the coupling means 39 of the liquid fuel source unit 31.

In particular, the tubular member 83 of the coupling 35 is interconnected to the outer hose 45 and carries a rotatable nut portion 84 thereon that is externally threaded at 85 and rotates on the tubular member 83 between an annular flange 86 thereof and a split ring 87 so that the threaded portion 85 of the nut 84 can be threaded into a threaded opening 88 of the coupling 39 to not only fluidly connect the inner hose 42 to a fuel dispensing passage 89 of the coupling 39 but also to fluidly interconnect the vapor recovery passage 47 to a vapor receiving passage means 90 of the coupling 39 as fully illustrated in FIG. 14. Thus it can be seen that the legs 80 of the spider means 76 maintain the coupling 70 of the inner hose 42 substantially concentric within the coupling 35 of the outer hose 34 while maintaining the vapor recovery passage 47 open therebetween as fully set forth in the aforementioned U.S. Pat. No. to Walker et al, 5,056,569.

The coupling 36 at the other end 38 of the hose assembly 34 is substantially identical to the coupling 35 previously described whereby like reference numerals are being utilized in the drawings for the coupling 36 that were utilized for the coupling 35 with the understanding that the spider means 58 holds the coupling 70 at the other end 91 of the inner hose 42 substantially concentric within the tubular member 83 of the coupling 36 in a manner similar to the spider means 76 previously described.

Figure 2:
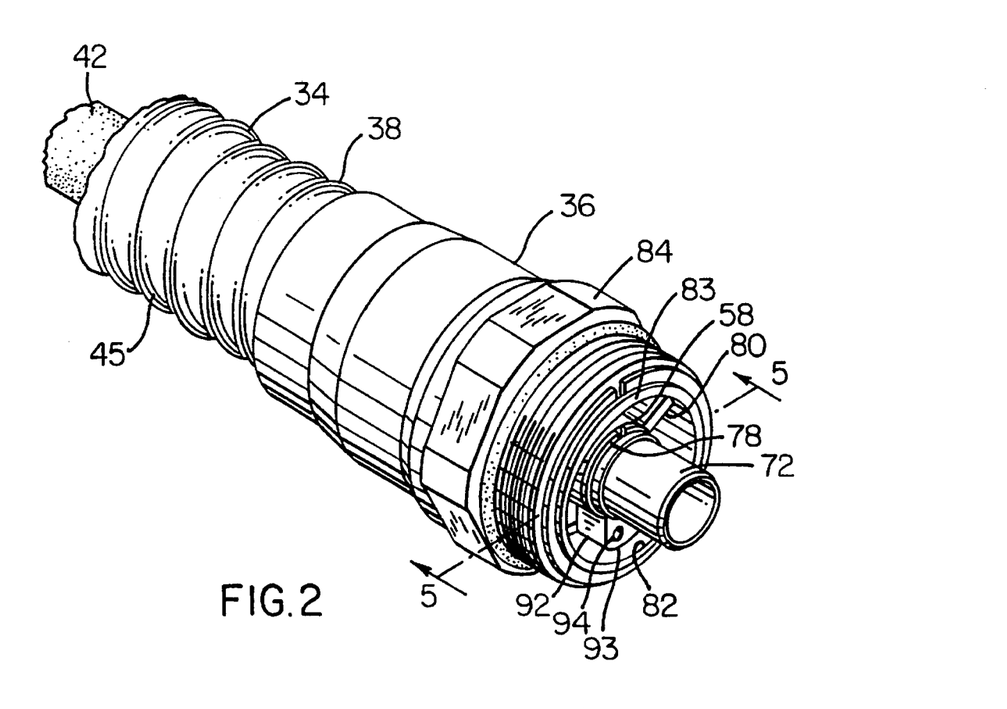
FIG. 2 is an enlarged fragmentary perspective view of one end of the hose assembly of the system of FIG. 1.
Figure 3:
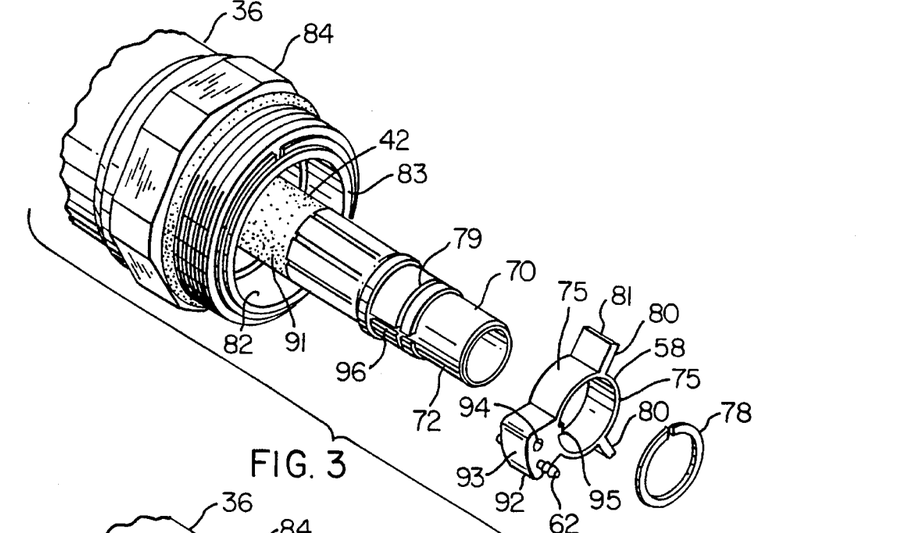
FIG. 3 is an exploded perspective view of various parts of the end of the hose assembly of FIG. 2.
Figure 4:
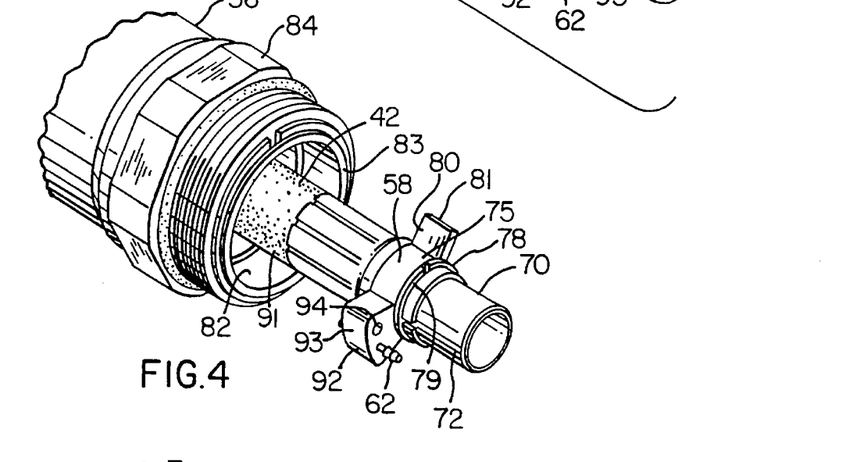
FIG. 4 is a view similar to FIG. 3 and illustrates how the parts illustrated in FIG. 3 are assembled together.
Figures 5, 6:
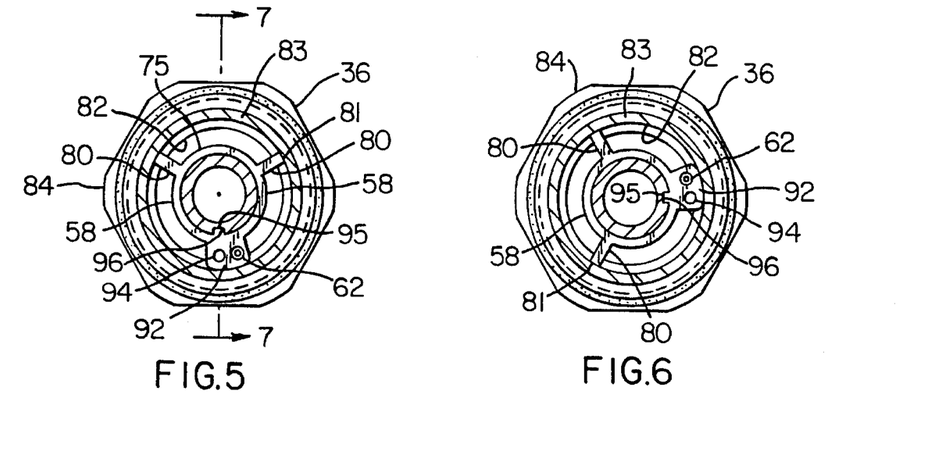
FIG. 5 is a cross-sectional view taken on line 5—5 of FIG. 2.
FIG. 6 is a view similar to FIG. 5 and illustrates the inner hose of the hose assembly having been rotated in a counterclockwise direction 90° from the position illustrated in FIG. 5.

However, it can readily be seen in FIGS. 3 and 4 that the spider means 58 while having the arcuate portion 75 and a plurality of substantially straight legs 80 extending radially outwardly therefrom has a unique leg 92 that is considerably wider than the legs 80 and has an arcuate free end 93 which mates with the arcuate surface 82 of the cooperating tubular member 83 as illustrated in FIGS. 2, 5 and 6.

In addition, the leg 92 of the spider means 58 not only has the passage means 57 passing therethrough but also has another opening means 94 passing therethrough for a purpose hereinafter described.

While the spider means 76 was described as being rotatably disposed on the insert portion 72 of the coupling 70, the spider means 58 is fixed from rotation on the insert portion 72 of the coupling 70 at the end 91 of the inner hose 42 by being splined thereto.

In particular, the arcuate portion 75 of the spider means 58 has an inwardly directed spline tang 95 that is adapted to be received in a spline slot means 96 formed in the insert portion 72 as illustrated in FIGS. 3 and 4 so that when the spider means 58 is subsequently held in position by the split ring 79 as illustrated in FIGS. 4–6, the spider means 58 rotates in unison with the inner hose 42 as the inner hose 42 rotates relative to the outer hose 45 as illustrated in FIGS. 5 and 6 for a purpose hereinafter set forth.

Figure 10:
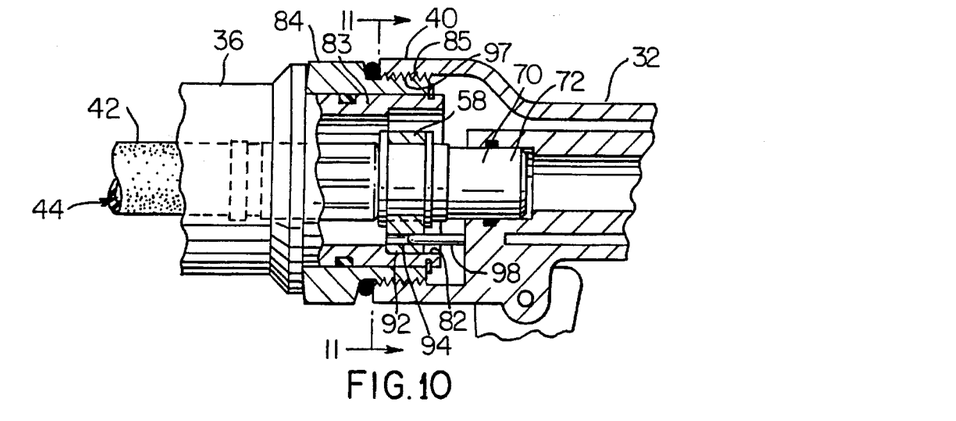
FIG. 10 is an enlarged fragmentary view that is partially in cross section and illustrating an end of the hose assembly interconnected with the dispensing nozzle.

When the nozzle 32 is coupled to the coupling means 36 at the end 38 of the hose assembly 34 in the manner illustrated in FIGS. 10 wherein the nut 84 is rotated so as to have the threaded portion 85 thereof thread into a threaded opening 97 of the nozzle 32, a locating pin 98 fixed to the nozzle 32 has its free end 99 received in the locating opening 94 of the leg 92 of the spider means 58 as illustrated in FIG. 10 so as to secure the nozzle 32 to the spider means 58 and thereby cause the spider means 58 to rotate in unison with the nozzle 32 and since the spider means 58 is fixed or secured to the inner hose 42 of the hose assembly 34 in the manner previously described, the inner hose 42 rotates in unison with the nozzle 32 and in the system 30 is permitted to rotate relative to the coupling means 39 of the liquid fuel source unit 31 whether or not the outer hose 45 rotates therewith or not.

Therefore, it can be seen that since the spider means 58 and the inner hose 42 rotate in unison with the nozzle 32, there is no tendency for the tube section 55 of the tubular means 50 to pull off of its respective insert 62 of the spider means 58 and likewise there is no tendency of the tubular length 56 to pull off of its respective insert 62 of the spider means 58.

Further, it can be seen that the tube section 56 is fastened to the inner hose 42 by a plurality of annular band means 100 that encircle the hose 42 as well as the tubular length 56 in spaced apart relation from the spider means 58 to a point 101 that is spaced from the inlet means 54 of the tube section 56 so that a short length 102 of the tube 56 is not banded to the inner hose 42 and in one working embodiment of this invention such short length 102 is approximately 3 inches long. In this manner, the filter 54 is adapted to fall by gravity against the internal peripheral surface 46 of the outer hose 45 at the drape area 48 when the tube section 56 is positioned by the inner hose 42 as illustrated in FIGS. 7 and 8. However, when the inner hose 42 is rotated 180° from the position illustrated in FIG. 8 to the position illustrated in FIG. 9 by a person rotating the nozzle 32 to cause such a condition, the length 102 of the tube section 56 is sufficiently long that the same permits the filter means 54 of the tube 56 to fall by gravity against the internal peripheral surface 46 of the outer hose 45 at the drape area 48 as illustrated in FIG. 9 and thereby will cause complete evacuation of any liquid that would occur at the drape area 48 regardless of the rotational position of the inner hose 42 relative to the ground.

Figure 11:
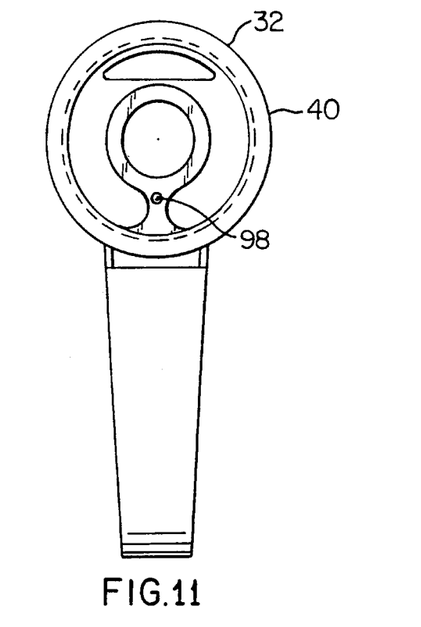
FIG. 11 is an end view of the dispensing nozzle illustrated in FIG. 10 and is taken in the direction of the arrows 11—11 of FIG. 10.
Figure 12:
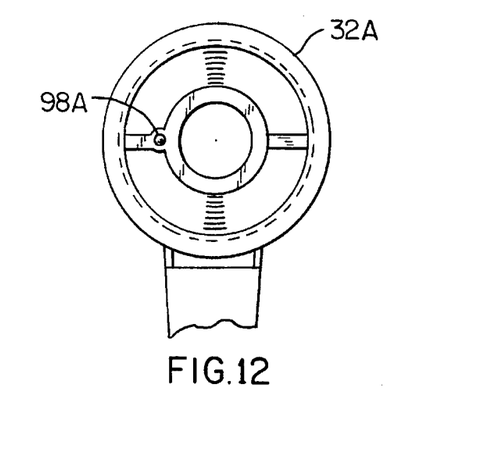
FIG. 12 is a view similar to FIG. 11 and illustrates another type of dispensing nozzle.
Figure 13:
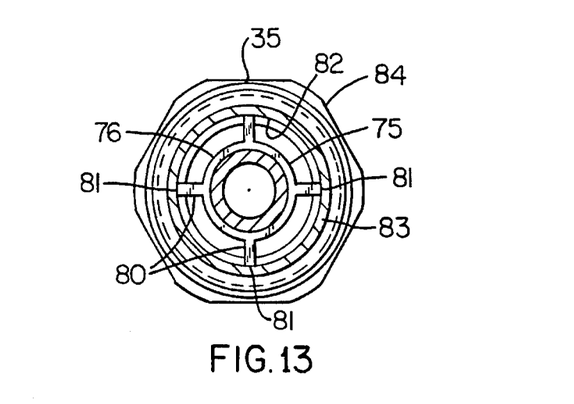
FIG. 13 is an end view of the hose-assembly of this invention at the end thereof that interconnects to the liquid fuel source unit and is taken in the direction of the arrows 13—13 of FIG. 14.

Also, such length 102 at the free end of the tube section 56 permits the hose assembly 34 of this invention to be utilized with other types of dispensing nozzles wherein a locating pin thereof is not normally disposed in the low position as illustrated in FIGS. 10 and 11 for the nozzle 32. For example, it can be seen in FIG. 12 that the nozzle 32A has the locating pin 98A thereof disposed 90° out of phase with the low point of the nozzle 32A and the hose assembly 34 of this invention will permit the pin 98A to be received within the locating opening 94 of the spider means 58 and still have the inlet means 54 of the tube section 56 disposed at the lowest position in the outer hose 45 at the drape area 48 for the reasons previously set forth.

Also, while the embodiments illustrated in the drawings has the nozzles 32 and 32A respectively utilizing locating pins 98 and 98A, it is to be understood that the spider means 58 could be secured to the desired nozzle by means other than a locating pin, such as by a screw means extending from the spider means 58 into a threaded opening in the nozzle as desired.

In addition, while the embodiment of the spider means 58 previously described has the spider means 58 secured to the insert 72 of the coupling 70 for the inner hose 42 by spline means 95, 96, the spider means 58 can be secured to the coupling in any other suitable manner.

For example, reference is now made to FIGS. 17 and 18 wherein another embodiment of the inner hose of this invention is indicated by the reference numeral 42B and parts thereof similar to the parts of the inner hose 42 previously described are indicated by like reference numerals followed by the reference letter "B".

As illustrated in FIGS. 17 and 18, the spider means 58B is formed integral and one-piece with the insert portion 72B so that when the insert portion 72B has a part 103 thereof disposed in the passage means 44B at the end 91B of the hose 42B and is then held in crimped position to the inner hose 42B by the tubular ferrule portion 104 of the coupling 70B being radially inwardly crimped as illustrated in FIG. 17 and in a manner well known in the art, the insert portion 72B is fixed to the hose 42B and, thus, the spider means 58B is secured to the inner hose 42B so as to cause the inner hose 42B to rotate in unison with the spider means 58B.

Conversely, the spider means 58B could be integral and one-piece with the ferrule portion 104 rather than the insert portion 72B.

For example, reference is now made to FIGS. 19 and 20 wherein another embodiment of the inner hose is indicated by the reference numeral 42C and parts thereof similar to the parts of the inner hoses 42 and 42B are indicated by like reference numerals followed by the reference letter "C".

As illustrated in FIGS. 19 and 20, it can be seen that the spider means 58C is formed integral and one-piece with the ferrule portion 104C so that when the ferrule portion 104C is utilized to crimp the end 91C of the hose 42C onto the insert portion 72C of the coupling 70C as illustrated in FIG. 19, the spider means 58C will be secured to the hose 42C so as to cause the hose 42C to rotate in unison with the spider means 58C all for the reasons previously set forth.

Therefore, it can be seen that it is a relatively simple method of this invention to form a hose assembly wherein the spider means at the nozzle end of the hose assembly is secured to the inner hose and is adapted to be secured to the nozzle when the nozzle is coupled to the hose assembly so that rotation of the nozzle will likewise cause the spider means and inner hose to rotate in unison therewith and that by providing a short length of the liquid evacuating tube means adjacent the drape area of the hose assembly, the inlet means of that tube means will always fall to the bottom of the drape area regardless of the rotational position of the inner hose relative to ground.

However, it is to be understood that the tube means of this invention can have other suitable types of inlet means therefor, if desired. For example, the inlet means can comprise any one of the inlet means disclosed in the copending patent application of Jeffrey M. Berger et al, Ser. No.

962,537, filed Oct. 16, 1992 and since the issue fee for this copending patent application has been paid, this copending patent application is being incorporated into this application by this reference thereto.

Accordingly, it can be seen that this invention not only provides a new fuel dispensing system and method of making the same, but also this invention provides a new hose assembly for such a system or the like and a new method of making such a hose assembly.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a spider means for a hose assembly for a system comprising a liquid fuel source unit, a dispensing nozzle, and said hose assembly, said hose assembly having a first fluid passage therein for conveying said liquid fuel in one direction from said liquid fuel source unit to said nozzle that is adapted to dispense said liquid fuel into a container and a second fluid passage therein for returning the vapors of said liquid fuel from said container to said liquid fuel source unit, said hose assembly comprising a flexible inner hose having an outer peripheral surface and defining said first fluid passage therein, said inner hose having a coupling comprising an insert portion attached to one end of said inner hose, and a flexible outer hose having an inner peripheral surface and being disposed around said inner hose, said inner peripheral surface of said outer hose and said outer peripheral surface of said inner hose defining said second fluid passage therebetween, said nozzle having a venturi section therein that tends to remove liquid from a drape area of said hose assembly when said nozzle is being utilized to dispense said liquid fuel into said container, said hose assembly having opposite ends one of which is adapted to be interconnected to said nozzle and the other of which is adapted to be interconnected to said liquid fuel source unit, said one end of said hose assembly having said spider means therein that tends to maintain said inner hose concentric within said outer hose, said spider means having a passage means therethrough, said hose assembly comprising a first tube section for connecting said passage means to said venturi section and a second tube section connected to said passage means and having inlet means located in said drape area, the improvement wherein said spider means is mounted on said coupling and has a first means adapted to be received in said insert portion of said coupling to prohibit rotational movement of said spider means relative to said coupling and has a second means adapted to be secured to said nozzle wherein said coupling, first means and second means cooperate so that said nozzle, said spider means and said inner hose are adapted to rotate in unison relative to said liquid fuel source unit.

2. A spider means as set forth in claim 1 wherein said spider means comprise a central annular portion and a plurality of spaced apart legs extending outwardly from said central annular portion, one of said legs having said passage means extending therethrough.

3. A spider means as set forth in claim 1 wherein said inner hose at said one end of said hose assembly has a coupling comprising an insert portion and a ferrule portion and wherein said spider means is integral and one-piece with one of said portions of said coupling so as to be adapted to be secured to said inner hose.

4. A spider means as set forth in claim 1 wherein said first means comprises spline means on said spider means and wherein said insert portion is a spline slot means, said spline means adapted to cooperate with said spline slot means to secure said spider means to said inner hose.

5. A spider means as set forth in claim 1 wherein said second means comprises an opening in said spider means adapted to receive a pin means extending from said nozzle.

6. A spider means as set forth in claim 1 wherein said spider means comprises a one-piece member.

7. A spider means as set forth in claim 6 wherein said spider means comprises a central annular portion and a plurality of spaced apart legs extending outwardly from said central annular portion, one of said legs having said passage means extending therethrough.

8. A spider means as set forth in claim 7 wherein said second means is carried by said one leg of said spider means.

9. A spider means as set forth in claim 8 wherein said second means comprises an opening means passing through said one leg of said spider means in spaced relation to said passage means through said one leg.

\* \* \* \* \*